(12) United States Patent
Smith et al.

(10) Patent No.: US 11,095,212 B2
(45) Date of Patent: Aug. 17, 2021

(54) LINE LOSS COMPENSATING POWER SUPPLIES

(71) Applicant: VERTIV ENERGY SYSTEMS, INC., Lombard, IL (US)

(72) Inventors: Michael Francis Smith, Columbia Station, OH (US); John H. Leitner, Lorain, OH (US)

(73) Assignee: Vertiv Corporation, Columbus, OH (US)

( * ) Notice: Subject to any disclaimer, the term of this patent is extended or adjusted under 35 U.S.C. 154(b) by 40 days.

(21) Appl. No.: 16/569,253

(22) Filed: Sep. 12, 2019

(65) Prior Publication Data

US 2020/0083803 A1 Mar. 12, 2020

Related U.S. Application Data

(60) Provisional application No. 62/730,266, filed on Sep. 12, 2018.

(51) Int. Cl.
*H02M 3/04* (2006.01)
(52) U.S. Cl.
CPC .................................. *H02M 3/04* (2013.01)
(58) Field of Classification Search
None
See application file for complete search history.

(56) References Cited

U.S. PATENT DOCUMENTS

| | | | |
|---|---|---|---|
| 8,754,622 B2* | 6/2014 | Dobkin | H02M 3/156 323/282 |
| 9,331,582 B2 | 5/2016 | Goerke | |
| 9,706,908 B2 | 7/2017 | Sidar | |
| 9,727,067 B2 | 8/2017 | Fujiwara et al. | |
| 9,906,117 B1* | 2/2018 | Hoffman | H02M 1/00 |
| 10,666,126 B2* | 5/2020 | Hoffman | G01R 31/40 |
| 2015/0015078 A1 | 1/2015 | Kim | |
| 2016/0241068 A1 | 8/2016 | Zhao et al. | |

* cited by examiner

*Primary Examiner* — Jeffrey A Gblende
(74) *Attorney, Agent, or Firm* — Harness, Dickey & Pierce, P.L.C.

(57) ABSTRACT

An electrical power supply includes a power circuit for providing power to a load via a conductor, and a control circuit. The control circuit is configured to set an output voltage of the power circuit at different values to cause the load voltage at the load to change, sense an output current of the power circuit corresponding to each different value of the output voltage, determine an electrical resistance of the conductor based on the different output voltage values and their corresponding output current values, and set the output voltage of the power circuit at a defined value based on the determined resistance to compensate for a voltage drop of the conductor when the power circuit provides power to the load and to regulate the load voltage at the load at a desired value. Other example power supplies, control circuits and/or methods of regulating load voltages are also disclosed.

18 Claims, 3 Drawing Sheets

LINE LOSS COMPENSATING POWER SUPPLIES

CROSS-REFERENCE TO RELATED APPLICATIONS

This application claims the benefit of U.S. Provisional Application No. 62/730,266 filed Sep. 12, 2018. The entire disclosure of the above application is incorporated herein by reference.

FIELD

The present disclosure relates to line loss compensating power supplies.

BACKGROUND

This section provides background information related to the present disclosure which is not necessarily prior art.

An electrical power supply is often controlled to regulate a DC voltage at a load to compensate for a voltage drop between the power supply and the load. In some examples, a sensing device is positioned at the load for measuring an electrical parameter of the load (e.g., a load voltage), and providing a feedback signal to the electrical power supply. In such examples, the power supply provides an output DC voltage to the load based on the feedback signal to compensate for the voltage drop. In other examples, the voltage drop between the power supply and the load is determined by superimposing an AC voltage. In such examples, an electrical component such as a load-side capacitor is placed at and/or within the load, and appears as a low impedance to the superimposed AC voltage as compared to the load.

SUMMARY

This section provides a general summary of the disclosure, and is not a comprehensive disclosure of its full scope or all of its features.

According to one aspect of the present disclosure, an electrical power supply includes a power circuit for providing DC power to a load via a conductor, and a control circuit coupled to the power circuit for controlling the power circuit to regulate a DC load voltage at the load. The control circuit is configured to set a DC output voltage of the power circuit at a plurality of different values to cause the DC load voltage at the load to change, sense an output current of the power circuit corresponding to each different value of the DC output voltage, determine an electrical resistance of the conductor based on the different DC output voltage values and their corresponding DC output current values, and set the DC output voltage of the power circuit at a defined value based on the determined electrical resistance to compensate for a voltage drop of the conductor coupled between the power circuit and the load when the power circuit provides DC power to the load, and to regulate the DC load voltage at a desired value.

According to another aspect of the present disclosure, a control circuit for controlling a power circuit of an electrical power supply to regulate a DC load voltage at a load is disclosed. The electrical power supply is configured to provide DC power to the load via a conductor. The control circuit is configured to set a DC output voltage of the power circuit at a plurality of different values to cause the DC load voltage at the load to change, sense an output current of the power circuit corresponding to each different value of the DC output voltage, determine an electrical resistance of the conductor based on the different DC output voltage values and their corresponding DC output current values, and set the DC output voltage of the power circuit at a defined value based on the determined electrical resistance to compensate for a voltage drop of the conductor coupled between the power circuit and the load when the power circuit provides DC power to the load, and to regulate the DC load voltage at a desired value.

According to one aspect of the present disclosure, a method of regulating a DC load voltage at a load is disclosed. The load is coupled to an electrical power circuit via a conductor. The method includes setting a DC output voltage of the electrical power circuit at a plurality of different values to cause the DC load voltage at the load to change, sensing an output current of the electrical power circuit corresponding to each different value of the DC output voltage, determining an electrical resistance of the conductor based on the different DC output voltage values and their corresponding DC output current values, and setting the DC output voltage of the electrical power circuit at a defined value based on the determined electrical resistance to compensate for a voltage drop of the conductor coupled between the electrical power circuit and the load when the power circuit provides DC power to the load, and to regulate the DC load voltage at a desired value.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
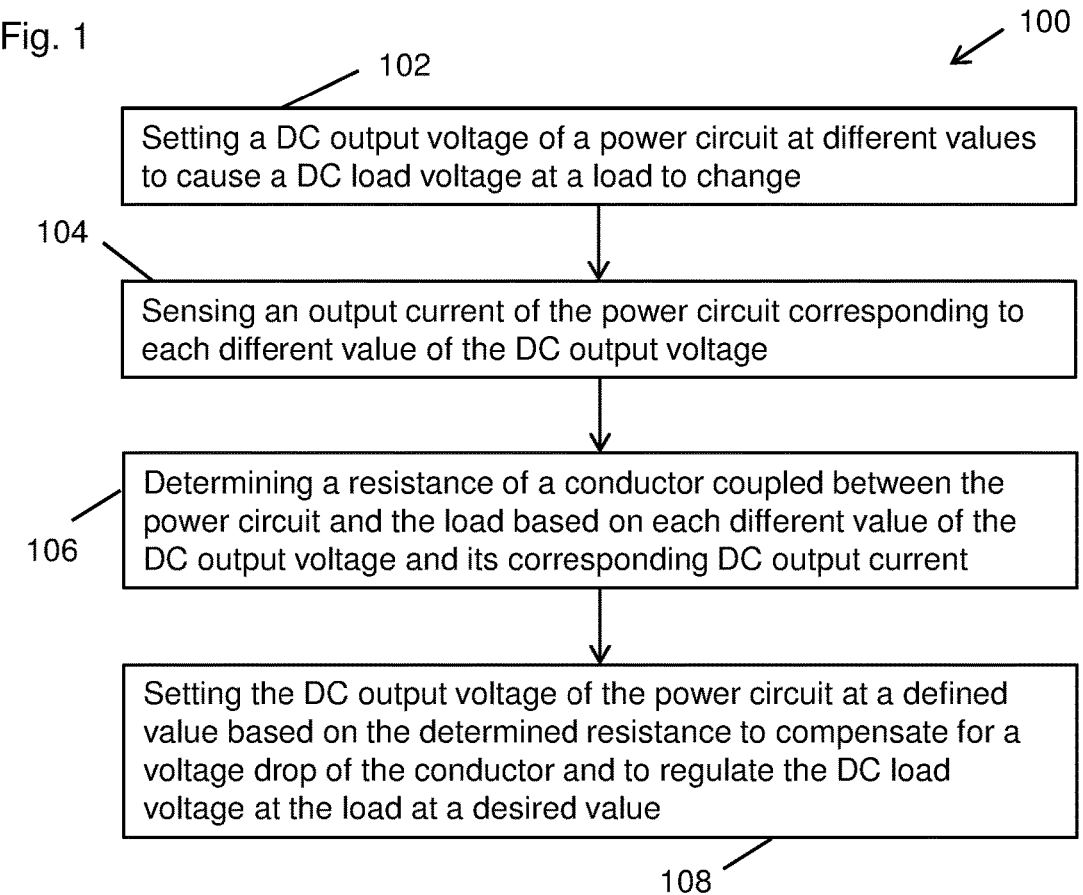
FIG. 1 is a flow chart of a method for setting an output voltage of a power circuit at a defined value to compensate for a voltage drop of a conductor coupled between the power circuit and a load, according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A method of regulating a DC load voltage at a load coupled to an electrical power circuit via a conductor according to one example embodiment of the present disclosure is illustrated in FIG. 1 and indicated generally by reference number 100. As shown in FIG. 1, the method 100 includes setting a DC output voltage of the power circuit at different values to cause the DC load voltage at the load to change in block 102, sensing an output current of the power circuit corresponding to each different value of the DC output voltage in block 104, determining an electrical resistance of the conductor based on the different DC output voltage values and their corresponding DC output current values in block 106, and setting the DC output voltage of the power circuit at a defined value based on the determined electrical resistance to compensate for a voltage drop of the conductor coupled between the power circuit and the load, and to regulate the DC load voltage at the load at a desired value in block 108.

By setting the output voltage based on the conductor's resistance as explained above, the power circuits disclosed herein compensate for line losses caused by the conductor's resistance. This allows the power circuits to regulate a DC voltage at the loads to ensure optimum performance and efficiency of the power circuits and the loads.

Additionally, and as further explained below, the power circuits may regulate the DC voltage at the loads without relying on load related components. For example, sometimes it is desirable to regulate a DC voltage at a remote load. To accomplish this, conventional power systems sometimes relied on load related components such as feedback components, load-side capacitances (e.g., an external capacitor coupled at the load and/or an internal capacitor coupled within the load), etc. As recognized by the subject inventors, employing these conventional power systems may require valuable space in and/or around the load, modification of existing loads, etc. to accommodate the load related components. However because the power circuits disclosed herein regulate the DC voltage at the loads without relying on load related components, the power circuits may be used to power loads remote from the power circuits, replace other (e.g., malfunctioning) power circuits powering existing loads without modifying the loads, etc.

Further, the power circuits may regulate the DC voltage at the loads without knowing and/or relying on particular characteristics of the conductors coupled between the power circuits and the loads. For example, the power circuits may regulate the DC voltage at the loads without knowing and/or relying on predetermined resistances, lengths, materials, thicknesses (e.g., gauge), etc. of the conductors. As such, the power circuits may power different loads via different conductors.

As explained above, the DC output voltage of the power circuit is set at different values causing the DC load voltage at the load to change. For example, the power circuit may regulate its output voltage at one value resulting in a particular value of the load voltage (e.g., the voltage at the load), and then regulate its output voltage at another different value resulting in another different value of the DC load voltage. This voltage regulation may be based on a feedback signal at the output of the power circuit, as further explained below.

In some embodiments, the DC load voltage at the load may be maintained within a defined voltage range when the output voltage of the power circuit is regulated at different values. For example, when the output voltage of the power circuit changes, the load voltage at the load is affected. However, the changes in the output voltage of the power circuit may be managed to ensure the load voltage at the load is maintained within a defined voltage range to ensure the load remains adequately powered. As such, the output voltage of the power circuit may be altered without causing a malfunction at the load.

This defined voltage range may be, for example, a voltage tolerance range of the load. For example, the defined voltage range may be +/−2 volts, +/−2.5 volts, +/−3 volts, etc. of a desired load voltage. In other embodiments, the upper and/or lower values of the voltage range may be based on, for example, load requirements, power circuit characteristics, conductor characteristics, etc.

Figure 2:
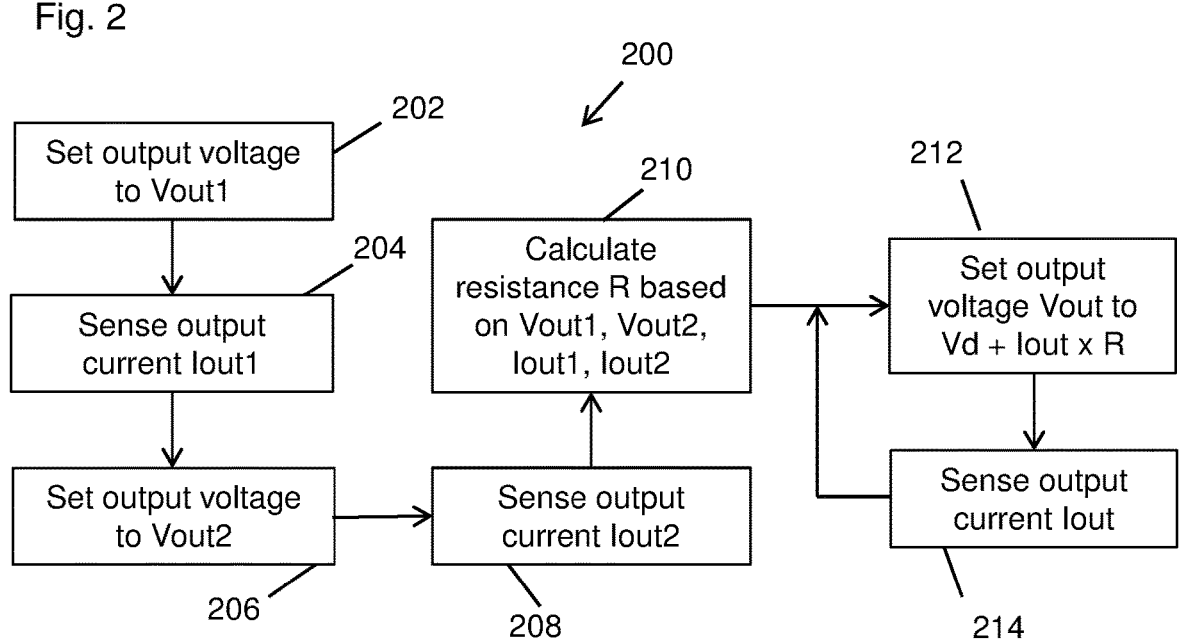
FIG. 2 is a flow chart of a method for calculating a resistance of a conductor coupled between a power circuit and a load according to another example embodiment.

FIG. 2 illustrates an example method 200 of regulating a DC load voltage at a load coupled to an electrical power circuit via a conductor. For example, the method 200 includes setting an output voltage of the power circuit to a value Vout1 in block 202, sensing an output current value Iout1 corresponding to the output voltage value Vout1 in block 204, setting the output voltage of the power circuit to another value Vout2 in block 206, and sensing an output current value Iout2 corresponding to the output voltage value Vout2 in block 208.

After the output voltage values Vout1, Vout2 and their corresponding output current values Iout1, Iout2 are known, the resistance of the conductor may be calculated based on the values in block 210. In some examples, it is desirable for the power consumed by the load to remain substantially constant (e.g., the same, a slow rate of change, etc.). This prevents resonance in the power circuit and the conductor coupled between the power circuit and the load. To ensure the power consumed by the load is substantially constant, the output current of the power circuit may be sensed again. For example, after the output voltage of the power circuit changes from the value Vout1 to the value Vout2, the output voltage is set again to the value Vout1 and the output current is sensed again. If the sensed output current value is equal to the value Iout1 (e.g., the sensed output current value during the first instance of when the output voltage is set to the value Vout1), the power consumption at the load has not substantially changed. In some examples, setting the output voltage to the values Vout1, Vout2, Vout1 and sensing the corresponding output current values may be repeated to ensure the power consumption at the load has not substantially changed.

If the power consumed by the load is substantially constant when, for example, the output voltage of the power circuit changes, the power consumed when receiving the output current value Iout1 may be substantially equal to the power consumed when receiving the output current value Iout2. As a result, the change in the power calculated at each set output voltage Vout1, Vout2 may be equal to the change in power loss in the conductor. This is expressed in the example equation (1) below:

$$P = Vout1 \cdot Iout1 - Iout1^2 R = Vout2 \cdot Iout2 - Iout2^2 R \quad (1)$$

where P represents the power consumed by the load, and R represents the total resistance of the conductor.

Equation (1) may be used to calculate the resistance R of the conductor. As such, in this particular example, the resistance R may be calculated based on the different output voltage values Vout1, Vout2 and their corresponding output current values Iout1, Iout2. For example, when solving for the resistance R of the conductor, equation (1) may be simplified into equation (2) below:

$$R = (Vout1 \cdot Iout1 - Vout2 \cdot Iout2)/(Iout1^2 - Iout2^2) \quad (2)$$

After determining the resistance R of the conductor, the output voltage Vout of the power circuit may be set at a defined value in block 212. The output voltage Vout may be set to a defined value higher than a desired load voltage Vd to compensate for the voltage drop of the conductor and ensure proper operation of the load. The voltage drop of the conductor may be based on an output current value Iout of the power circuit and the calculated resistance R. The defined value of the power circuit's output voltage may be determined with equation (3) below:

$$Vout = Vd + (R \cdot Iout) \quad (3)$$

In such examples, the desired load voltage Vd and the resistance R are known (e.g., defined, calculated, etc.), and the output current value Iout may change due to power consumption changes in the load. For example, an initial output current value Iout may be a previously sensed value (e.g., Iout1, Iout2, etc.) of the output current, a defined current value, etc. In some examples, the output current may be optionally sensed (again) after the output voltage Vout of the power circuit is set in block 214, and this sensed output current value Iout may be used to set (and/or reset) the power circuit's output voltage Vout at a defined value. As such, the defined value of the output voltage Vout may be adjusted as necessary based on the changing output current to maintain a substantially constant regulated voltage Vd at the load.

For exemplary purposes only, the output voltage of the power circuit may be set to 54 VDC (e.g., Vout1). At this particular output voltage Vout1, the sensed output current of the power circuit may be equal to 16.5 A (e.g., Iout1). Next, the output voltage of the power circuit may be set to 58 VDC (e.g., Vout2). The sensed output current at this second output voltage Vout2 may be equal to 15 A (e.g., Iout2). Based on these exemplary values, the resistance R of the conductor is calculated to equal 0.44 ohms when using equation (2) above. If, for example, the load requires 54 VDC (Vd), the output voltage of the power circuit may be set (or reset) to equal 54 VDC+0.44 ohms*Iout, as explained above with reference to equation (3).

The output voltage of the power circuit may be adjusted as necessary based on equation (3) above. In some examples, the output voltage Vout may be continuously adjusted. In such examples, the output current Iout of the power circuit and/or a power circuit parameter indicative of the output current Iout may be continuously sensed to determine the output voltage necessary to achieve the desired load voltage Vd. In other examples, the output voltage Vout may be periodically and/or randomly adjusted, and the output current Iout and/or the power circuit parameter indicative of the output current may be periodically and/or randomly sensed.

Although the above examples rely on the particular example equations (1-3) for regulating the load voltage, it should be apparent to those skilled in the art that other suitable equations and/or methods may be employed for regulating the load voltage without departing from the scope of the disclosure.

The example methods disclosed herein may be implemented by one or more control circuits. For example, FIGS. 2-5 illustrate various example embodiments of electrical power supplies including one or more control circuits configured to implement various methods including, for example, the methods disclosed herein. It should be understood, however, that the teachings of this disclosure are not limited to the particular examples shown in FIGS. 2-5, and can be applied to a wide variety of other electrical power supplies.

Figure 3:
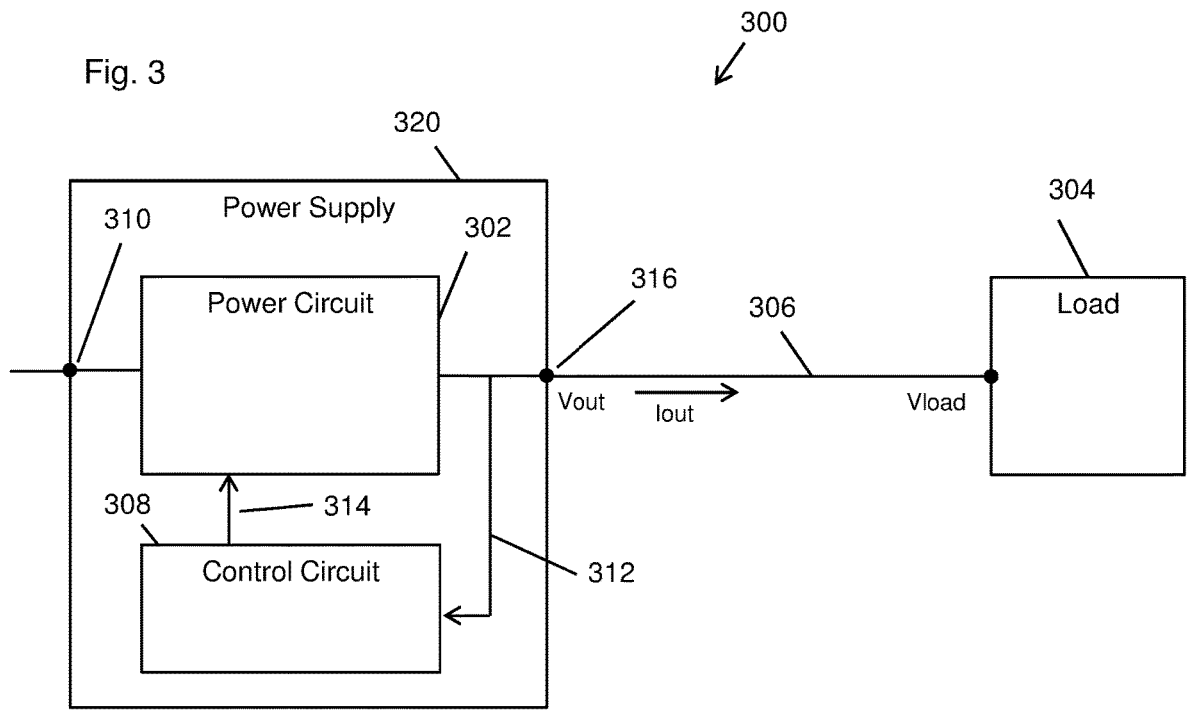
FIG. 3 is a block diagram of a power supply for powering a load, and including a control circuit for setting an output voltage to compensate for a voltage drop of a conductor coupled between the power supply and the load, according to yet another example embodiment.

For example, FIG. 3 illustrates an electrical power system 300 including an electrical power supply 320, a load 304, and a conductor 306 coupled between the power supply 320 and the load 304. As shown, the power supply 320 includes an input terminal 310, an output terminal 316, a power circuit 302 coupled between the input terminal 310 and the output terminal 316, and a control circuit 308. The output terminal 316 of the power supply 320 couples to the conductor 306 for providing a DC output voltage Vout to the load 304 via the conductor 306. The control circuit 308 is coupled to the power circuit 302 for controlling the power circuit 302 to regulate a DC load voltage Vload at the load 304.

As explained above, the control circuit 308 sets the DC output voltage Vout of the power circuit 302 to different values, and then determines the DC output current Iout corresponding to each different value of the DC output voltage Vout. For example, the control circuit 308 may set the output voltage Vout and sense a corresponding output current Iout two or more times. For instance, the control circuit 308 may set the output voltage Vout of the power circuit 302 a first value (e.g., Vout1), and sense a value (e.g., Iout1) of the output current passing through the conductor 306 corresponding to that output voltage value Vout1. Then, the control circuit 308 may set the output voltage Vout to a second different value (e.g., Vout2), and sense a value (e.g., Iout2) of the output current corresponding to the second output voltage value Vout2.

As shown in FIG. 3, the control circuit 308 receives a feedback signal 312, and outputs a control signal 314 to the power circuit 302. The feedback signal 312 may be indicative of, for example, the output voltage Vout of the power circuit 302. In some examples, the control circuit 308 may compare the feedback signal 312 with a reference voltage (e.g., a set output voltage value) via an error amplifier or similar control circuit component. In such examples, the control circuit 308 may generate an error signal and provide the control signal 314 based on the generated error signal. As such the feedback signal 312 and the control signal 314 may assist in regulating the output voltage Vout and the load voltage Vload.

Although not shown, the power circuit 302 may include one or more power switches controllable by the control circuit 308. As such, the power supply 320 may be considered a switched mode power supply. In such examples, the control circuit 308 may regulate the output voltage Vout of the power circuit 302 at different output voltage values, regulate the load voltage Vload at the load 304, etc. by controlling the power switches of the power circuit 302. In such examples, the control signals 314 may be PWM control signals, PFM control signals, etc.

The power circuit 302 may include one or more DC/DC power converters, AC/DC power converters (e.g., rectifiers), DC/AC power converters (e.g., inverters). Additionally, the power converter(s) may have one or more suitable topologies such as boost, buck, buck-boost, flyback, forward, push-pull, half-bridge, full-bridge, etc. topologies (including their resonant counterparts where applicable). In some examples, the power circuit 302 may include multiple power stages such as a front-end AC/DC rectifier and a DC/DC output power converter.

Figure 4:
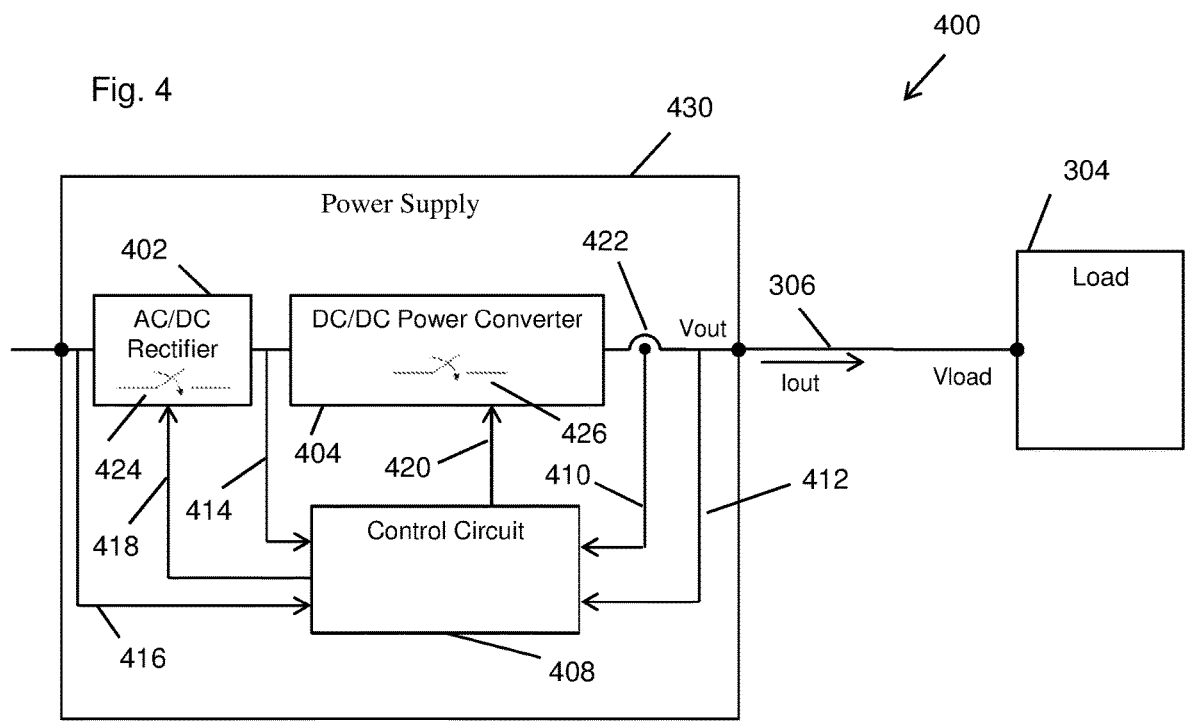
FIG. 4 is a block diagram of a power supply for powering a load, and including an AC/DC rectifier and a DC/DC power converter according to another example embodiment.

For example, FIG. 4 illustrates an electrical power system 400 including the load 304 and the conductor 306 of FIG. 3, and a switched mode power supply 430 for powering the load 304. As shown, the switched mode power supply 430 includes a power circuit and a control circuit 408. In the particular example of FIG. 4, the power circuit includes an AC-DC rectifier 402 having at least one power switch 424 and a DC/DC power converter 404 having at least one power switch 426. The control circuit 408 generates control signals (e.g., PWM control signals, PFM control signals, etc.) 418, 420 for controlling the switches 424, 426, respectively.

In the particular example of FIG. 4, the control circuit 408 may receive one or more signals representing various electrical parameters in the power supply 430. For example, the control circuit 408 may optionally receive a feedback signal 412 indicative of the output voltage Vout of the power converter 404 (and the power supply 430), a feedback signal 410 indicative of the output current Iout of the power converter 404 (and the power supply 430), a signal 414 indicative of an input voltage of the power converter 404 (and/or an output voltage of the rectifier 402), and/or a signal 416 indicative of an input voltage of the rectifier 402. Any one or more of the signals 410, 412, 414, 416 may be used to generate the control signals 418, 420 for controlling the power switches 424, 426.

The control circuit 408 of FIG. 4 includes similar functionality and features as the control circuit 308 of FIG. 3. For example, the control circuit 408 sets (and regulates) the output voltage Vout of the power supply 430 to different values by controlling the power switch 426 based on the feedback signal 412. The control circuit 408 senses the output current Iout of the power supply 430 for each corresponding set output voltage value via the current feedback signal 410, and determines a resistance of the conductor 306 as explained herein. The control circuit 408 may then set the output voltage Vout of the power supply 430 to a defined value based on the determined resistance to compensate for a voltage drop of the conductor 306, as explained herein.

The output currents disclosed herein may be sensed with conventional methods such as one or more sensors or other suitable methods. For example, the conductor 306 of FIG. 4 may be coupled to an output terminal of the power supply 430 for providing power to the load 304. In such examples, the power supply 430 may include a current sensor 422 coupled to and/or adjacent to the output terminal. In other examples, the conductor 306 may be coupled to an output terminal of the power converter 404, and the current sensor 422 may be coupled to and/or adjacent to the output terminal of the power converter 404. The current sensor 422 may be a suitable current sensor such as a sense resistor, a current transformer, etc. for sensing (e.g., sampling, etc.) the output current Iout.

Figure 5:
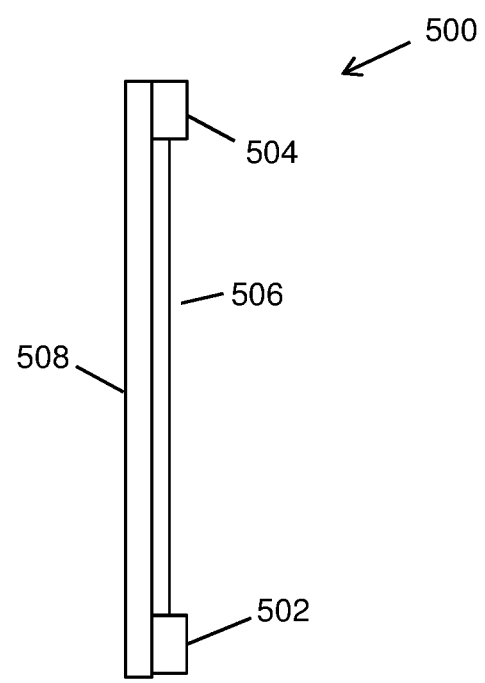
FIG. 5 is a block diagram of a tower, a load located near the top of the tower, and a remote power supply for powering the load, according to yet another example embodiment.

In some examples, the power supplies disclosed herein may supply power to loads remote from the power supplies. For example, FIG. 5 illustrates an electrical power system 500 including a power supply 502, a load 504 remote from the power supply 502, and a conductor 506 coupling the power supply 502 to the load 504. In some examples, the distance between the load 504 and the power supply 502 may be less than 50 feet, 50 feet, 100 feet, 200 feet, 500 feet, more than 500 feet, etc. In such examples, the length of the conductor 506 may be substantially equal to the distance between the load 504 and the power supply 502. For example, the conductor length may be 50 feet (with a loop length of 100), 500 feet (with a loop length of 1000 feet), etc.

The power supply 502 may include any one of the power supplies disclosed herein and/or another suitable power supply including one or more features disclosed herein. For example, the power supply 502 may include the power supply 430 of FIG. 4.

In the particular example of FIG. 5, the load 504 may be one or more radio units on a communication tower 508 such as a cell tower. As shown in FIG. 5, the load 504 may be positioned adjacent to the top of the tower 508. In such examples, the power supply 502 may be positioned adjacent to the bottom of the tower 508 and provide power to one or more of the radio units. For example, the power supply 502 may be attached to the bottom portion of the tower 508 as shown in FIG. 5, or detached from the tower 508 (e.g., on a nearby structure such as a pedestal, etc.). In other examples, the load 504 (e.g., a radio unit, etc.) may be positioned on and/or adjacent to another suitable structure such as a building rooftop, etc.

The power supplies and control circuits disclosed herein may regulate the voltage at the loads without relying on load related components. For example, the loads may be difficult to access and/or inaccessible, the distance between the power supplies and the loads may be large (e.g., remote loads) and/or the available space in and/or around the loads may be limited. In such examples, it may be difficult to employ, install, etc. feedback equipment (e.g., sensors, control circuitry, cables for feedback signals, communication components, etc.), load-side capacitors, etc. at the loads. However, because the control circuits regulate the voltage at the loads based on parameters of the power supplies (and not the loads), feedback equipment, load-side capacitors, etc. are not required. As a result, costs associated with the feedback equipment, load-side capacitors, etc. may be eliminated. As such, and as shown in FIGS. 3 and 4, the control circuits 308, 408 regulate the load voltage Vload at the load 304 without receiving feedback information from the load 304. Additionally, the power supplies 320, 430 do not rely on load-side capacitors (or other components with low impedances at high frequencies) for bypassing the load 304 to ensure the load voltage Vload remains unchanged.

Additionally, because the power supplies and control circuits regulate the voltage at the loads without relying on load related components, any one or more of the features disclosed herein may be implemented in existing (e.g., previously installed) power supplies and/or new power supplies. For example, existing power supplies may be augmented to regulate voltages at existing loads coupled to the power supplies without adding, modifying, etc. load related components.

The features disclosed herein may be implemented in one or more hardware components and/or software. For example, any one of the control circuits disclosed herein may include necessary hardware and/or software components for determining a resistance of a conductor coupled between a load and a power circuit. For instance, equations for determining a resistance of a conductor may be implemented with hardware and/or software components. The control circuits may include an analog control circuit, a digital control circuit (e.g., a digital signal controller (DSC), a digital signal processor (DSP), etc.), or a hybrid control circuit (e.g., a digital control circuit and an analog control circuit).

In some examples, instructions for performing any one or more of the features disclosed herein may be stored in and/or transferred from a non-transitory computer readable medium, etc. to existing control circuits, new control circuits, etc. In such examples, one or more of the instructions may be stored in volatile memory, nonvolatile memory, ROM, RAM, one or more hard disks, magnetic disk drives, optical disk drives, removable memory, non-removable memory, magnetic tape cassettes, flash memory cards, CD-ROM, DVDs, cloud storage, etc. For example, the computer readable medium may include instructions for at least determining a resistance of a conductor coupled between a power supply and a load based on output voltage values and output current values of the power supply, and setting an output voltage of the power supply to a defined value based on the determined resistance to compensate for a voltage drop of the conductor.

The conductors disclosed herein may be formed of one or more suitable electrically conductive materials allowing electrical current to flow. For example, the conductors may be formed of copper, aluminum, etc. and/or alloys thereof. Any one of the conductors may include one or more busbars, wires, cables, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electrical power supply comprising:
    a power circuit for providing DC power to a load via a conductor; and
    a control circuit coupled to the power circuit for controlling the power circuit to regulate a DC load voltage at the load, the control circuit configured to set a DC output voltage of the power circuit at a plurality of different values to determine an electrical resistance of the conductor and cause the DC load voltage at the load to change, sense an output current of the power circuit corresponding to each different value of the DC output voltage, determine the electrical resistance of the conductor based on the different DC output voltage values and their corresponding DC output current values, and set the DC output voltage of the power circuit at a defined value based on the determined electrical resistance to compensate for a voltage drop of the conductor coupled between the power circuit and the load when the power circuit provides DC power to the load, and to regulate the DC load voltage at a desired value, wherein the control circuit is configured to control the power circuit to maintain the DC load voltage within a defined voltage range above zero to ensure the load remains powered when the DC output voltage is set at the plurality of different values to determine the electrical resistance of the conductor.

2. The electrical power supply of claim 1 wherein the power circuit includes an output terminal for coupling to the conductor, and a current sensor coupled to the output terminal to sense the DC output current of the power circuit.

3. The electrical power supply of claim 1 wherein the control circuit is configured to set the DC output voltage of the power circuit at the defined value based on the determined electrical resistance, the desired value of the DC load voltage and the output current of the power circuit.

4. The electrical power supply of claim 1 wherein the control circuit does not receive feedback from the load.

5. The electrical power supply of claim 1 wherein the DC output voltage is set at the plurality of different values without reliance on a capacitor at the load.

6. An electrical power system comprising the electrical power supply of claim 1, a load, and a conductor, wherein the conductor is coupled between the electrical power supply and the load.

7. The electrical power system of claim 6 wherein the load is positioned on a structure, and wherein the electrical power supply is positioned at a different location on the structure than the load or not positioned on the structure.

8. The electrical power supply of claim 1 wherein the defined voltage is a voltage tolerance of the load.

9. A control circuit for controlling a power circuit of an electrical power supply to regulate a DC load voltage at a load, the electrical power supply configured to provide DC power to the load via a conductor, the control circuit configured to set a DC output voltage of the power circuit at a plurality of different values to determine an electrical resistance of the conductor and cause the DC load voltage at the load to change, sense an output current of the power circuit corresponding to each different value of the DC output voltage, determine the electrical resistance of the conductor based on the different DC output voltage values and their corresponding DC output current values, and set the DC output voltage of the power circuit at a defined value based on the determined electrical resistance to compensate for a voltage drop of the conductor coupled between the power circuit and the load when the power circuit provides DC power to the load, and to regulate the DC load voltage at a desired value, wherein the control circuit is configured to control the power circuit to maintain the DC load voltage within a defined voltage range above zero to ensure the load remains powered when the DC output voltage is set at the plurality of different values to determine the electrical resistance of the conductor.

10. The control circuit of claim 9 wherein the control circuit is configured to set the DC output voltage of the power circuit at the defined value based on the determined electrical resistance, the desired value of the DC load voltage and the output current of the power circuit.

11. The control circuit of claim 10 wherein the control circuit does not receive feedback from the load.

12. The control circuit of claim 10 wherein the DC output voltage is set at the plurality of different values without reliance on a capacitor at the load.

13. The control circuit of claim 9 wherein the defined voltage is a voltage tolerance of the load.

14. A method of regulating a DC load voltage at a load coupled to an electrical power circuit via a conductor, the method comprising:
  setting a DC output voltage of the electrical power circuit at a plurality of different values to determine an electrical resistance of the conductor and cause the DC load voltage at the load to change;
  maintaining the DC load voltage within a defined voltage range above zero to ensure the load remains powered when the DC output voltage is set at different values to determine the electrical resistance of the conductor;
  sensing an output current of the electrical power circuit corresponding to each different value of the DC output voltage;
  determining the electrical resistance of the conductor based on the different DC output voltage values and their corresponding DC output current values; and
  setting the DC output voltage of the electrical power circuit at a defined value based on the determined electrical resistance to compensate for a voltage drop of the conductor coupled between the electrical power circuit and the load when the power circuit provides DC power to the load, and to regulate the DC load voltage at a desired value.

15. The method of claim 14 wherein setting the DC output voltage of the electrical power circuit at the defined value to regulate the DC load voltage includes setting the DC output voltage at the defined value without receiving feedback from the load.

16. The method of claim 15 wherein setting the DC output voltage of the electrical power circuit at the defined value includes setting the DC output voltage at the defined value based on the determined electrical resistance, the desired value of the DC load voltage and the output current of the electrical power circuit.

17. The method of claim 14 wherein setting the DC output voltage of the electrical power circuit at the plurality of different values includes setting the DC output voltage at the plurality of different values without relying on a capacitor at the load.

18. The method of claim 14 wherein the defined voltage range is a voltage tolerance of the load.

* * * * *